United States Patent [19]
Beckett et al.

[11] Patent Number: 5,902,621
[45] Date of Patent: May 11, 1999

[54] FORMING ARTICLES OF FAT-CONTAINING CONFECTIONERY MATERIAL INCLUDING CHOCOLATE

[75] Inventors: Stephen Thomas Beckett, Wigginton; Mark Jury, Thirsk; Malcolm Robert Mackley, Crescent, all of United Kingdom

[73] Assignee: Nestec S.A., Vevey, Switzerland

[21] Appl. No.: 08/741,215

[22] Filed: Oct. 29, 1996

[30] Foreign Application Priority Data

Oct. 30, 1995 [GB] United Kingdom .................. 9522162
Aug. 19, 1996 [GB] United Kingdom .................. 9617652

[51] Int. Cl.⁶ .............................. A23G 7/00; A23P 1/12
[52] U.S. Cl. ..................... 426/279; 426/280; 426/282; 426/512; 426/516; 426/138; 426/389; 425/294
[58] Field of Search ................... 426/279, 282, 426/660, 512, 516, 138, 389, 280; 425/238, 294

[56] References Cited

U.S. PATENT DOCUMENTS

| | | | |
|---|---|---|---|
| 1,628,251 | 5/1927 | Laskey | 426/516 |
| 1,649,307 | 11/1927 | Hunter | 426/516 |
| 3,098,746 | 7/1963 | Noznick et al. | 99/23 |
| 3,307,503 | 3/1967 | Elmer, Jr. et al. | 426/516 |
| 4,076,207 | 2/1978 | Austin | 426/389 X |
| 4,120,627 | 10/1978 | Abe | 425/294 X |
| 4,468,186 | 8/1984 | Sollich et al. | 425/294 |
| 4,713,256 | 12/1987 | Chaveron et al. | 426/660 X |
| 5,198,257 | 3/1993 | Heck et al. | 426/282 |
| 5,439,695 | 8/1995 | Mackey | 426/516 |

FOREIGN PATENT DOCUMENTS

| | | |
|---|---|---|
| 0603467 | 6/1994 | European Pat. Off. . |
| 223362 | 10/1924 | United Kingdom . |
| 281502 | 12/1927 | United Kingdom . |
| 385571 | 3/1931 | United Kingdom . |
| 1527240 | 10/1978 | United Kingdom . |
| 1538722 | 1/1979 | United Kingdom . |
| 1604585 | 12/1981 | United Kingdom . |
| 2270828 | 3/1994 | United Kingdom . |
| 9504686 | 3/1995 | United Kingdom . |

OTHER PUBLICATIONS

Beckett et al., "The cold Extrusion of Chocolate", Food and Bioproducts Processing, Transactions of The Institute of Chemical Engineers, Part C, vol. 72, No. C1, pp. 47–54, Mar. 1994.

*Primary Examiner*—Milton Cano
*Attorney, Agent, or Firm*—Vogt & O'Donnell, LLP

[57] ABSTRACT

Shaped articles of fat-containing confectionery material are formed by extruding a fat-based confectionery material under pressure so that it passes to and through a flow-constriction and a die so that the material subjected to extrusion and the extrudate from the die are in a non-pourable state and so that the material subjected to extrusion plastically deforms and so that the extrudate is plastically deformable, and then while the extrudate is plastically deformable, extrudate is placed in a molding tool and pressed to shape an article which then is demolded, or extrudate is fed to a nip of counter-rotating rollers having depressions which upon passage of the extrudate in the nip between the rollers shape the extrudate.

19 Claims, 3 Drawing Sheets

FORMING ARTICLES OF FAT-CONTAINING CONFECTIONERY MATERIAL INCLUDING CHOCOLATE

BACKGROUND OF THE INVENTION

The present invention relates to perparing articles of fat-based confectionery material, including chocolate, by forming a fat-based confectionery material, including chocolate, into a desired shape.

One method of forming chocolate into a desired shape is by moulding. Moulding of chocolate is normally carried out in the liquid state by casting, i.e. pouring the molten chocolate into a mould followed by cooling. The moulded chocolate is usually demoulded quite easily after cooling, due to the thermal contraction of the chocolate as it sets, giving a product with an attractive glossy surface. However, the disadvantages of conventional chocolate moulding are the requirement for cooling tunnels which consume space and time, the product cannot be wrapped directly because of the cooling step and it is not possible to achieve exact weight control. The formation of the chocolate centres for SMARTIES candy, currently involves the use of rollers which also require a very high cooling capacity.

European Patent Application Publication No. 0 603 467, which sets forth the contents of Application No. 93114251.7, (herein "the '467 Application") describes a process for plastically extruding a fat-containing confectionery material which comprises feeding the fat containing confectionery material into an extrusion device and applying pressure to the fat-containing confectionery material in a substantially solid or semi-solid non-pourable form upstream of a flow constriction whereby the temperature, pressure, contraction ratio and extrusion rate are such that the fat-containing confectionery material is extruded substantially isothermally and remains in a substantially solid or semi-solid non-pourable form to produce an axially homogeneous extruded product and which has a temporary flexibility or plasticity enabling it to be physically manipulated, cut or plastically deformed, e.g. it can be bent, twisted or forced into a mould. The '467 Application also describes an injection moulding process wherein the temporarily flexible extruded product is injection moulded under pressure at a temperature below the normal melting point of chocolate. This injection moulding process is substantially isothermal and subsequent cooling is therefore unnecessary so that the product is suitable for demoulding immediately after the injection moulding is complete. However, because a subsequent cooling is not necessary, thermal contraction does not necessarily occur and, in some circumstances, demoulding and obtaining a high quality surface finish may be difficult to achieve.

SUMMARY OF THE INVENTION

We have now found, surprisingly, that it is possible to form the temporarily flexible solid or semi-solid non-pourable or non-flowable extruded fat-containing confectionery material chocolate, into a variety of shapes having a high quality surface finish by compression moulding, pressing or deforming the extruded chocolate.

Accordingly, the present invention provides a process for forming an extruded fat-containing confectionery material which comprises feeding the fat-containing confectionery material into an extrusion device and applying pressure to the fat-containing confectionery material in a substantially solid or semi-solid non-pourable or non-flowable form upstream of a flow constriction whereby the temperature, pressure, contraction ratio and extrusion rate are such that the fat-containing confectionery material is extruded substantially isothermally and remains in a substantially solid or semi-solid non-pourable or non-flowable form and which has a temporary flexibility or plasticity, characterised in that, while the extruded product exhibits the temporary flexibility, the extruded product, is compression moulded, pressed, or deformed into the desired shape.

DETAILED DESCRIPTION OF THE INVENTION

The compression moulded extruded solid product according to the present invention may be prepared by placing a measured amount (either a weighed amount or a cut length) of the extruded solid product into the cavity of a compression moulding tool, closing the tool under pressure to compress the extruded solid product into the shape of the cavity defined by the top and bottom halves of the compression tool, and finally opening the mould to release the formed product. If desired, the moulds may be cooled to assist demoulding by hardening of the extruded solid product. Advantageously, the moulds may be polished or surface treated, e.g. provided with a TEFLON material coat, to assist demoulding and to enhance the surface finish. Optionally, demould mechanisms such as stripper plates, compressed air ejection, pins, etc., may be employed to assist demoulding. The compression moulded extruded solid product may be, for instance, a solid 3-dimensional shape or a hollow shell, especially a thin-walled shell such as an Easter Egg. The product so formed may then, if desired, be wrapped or further processed, e.g. filled with one or more other foodstuffs, preferably a confectionery foodstuff such as a dessert, wafer, caramel, fondant, ice cream, etc.

The present invention also provides a compression moulded extruded solid product according to the present invention in the form of a hollow shell filled with at least one other foodstuff, e.g. one or more of ice cream, wafer, caramel, fondant, biscuits, praline jelly, etc.

Some advantages of compression moulding of a temporarily flexible solid extruded product according to the present invention over injection moulding and other forming techniques are as follows:

a) the production rate is high speed, b) there is no waste from feed runners as in injection moulding, and c) the equipment is relatively low cost—all that is required is an extruder and a simple pressing device.

The pressing device can be manually operated with levers, or pneumatically or hydraulically powered. The compression pressure will depend on the degree of plasticity of the extruded product which is controlled by the extrusion conditions, the number of pieces being formed (i.e. there could be a multi-cavity press), the complexity of the shape and the size of the piece. In some cases, hand pressure is sufficient to press the chocolate into the shape of the mould.

A further advantage of compression moulding a temporarily flexible solid extruded product according to the present invention is the possibility of using "in-mould packaging" where a food-grade lining material, e.g. a packaging film, such as described in UK Patent Application No. GB-A-95 04686.8 can be placed in the compression moulding tool prior to addition of the piece of extruded solid product. When the mould is closed, the piece of extruded solid product is formed into the lining material and the advantages of in-mould packaging are:

a) the product is ready-wrapped, b) thin-walled or delicate products can be easily removed because the packaging film supports them and prevents damage or deformation, c) the packaging film can be used to carry the product through further downstream operations such as filling with ice cream in which case the packaging film could then also be used as the primary packaging, d) the compression moulded product can be removed and the food-grade lining material reused, recycled or discarded, and e) if the packaging film is sufficiently ductile, pre-forming is not required since the compression moulding would force the film into the required shape.

As described in UK Patent Application GB-A-95 04686.8 the lining material may be a plastic or metallic material. As well as being capable of being formed into the shape of the mould, the lining material should be sufficiently flexible to be demoulded from the cavity face of the mould and from the product. For instance, the lining material may be a thin flexible film material or a thicker, rigid vacuum-formable material, e.g. made of plastic. The thin flexible film materials may have a thickness of from 5 to 500 microns, preferably from 10 to 100 microns, and more preferably from 20 to 550 microns, e.g. 30 micron polypropylene. The rigid vacuum-formable materials may have a thickness of from 50 to 1500 microns preferably from 200 to 400 microns, e.g. 300 micron polyvinyl chloride (PVC). In addition, thin film PVC which is sufficiently ductile in both directions, such as CLINGFILM, may be used, or a linear low-density polyethylene may be used. An example of a suitable metallic material is aluminum having a thickness of from 10 to 500 microns, preferably from 50 to 200 microns. If desired, metallised plastic films may be used, e.g. metallised polypropylene where the metal is aluminum. The material used to line the mould may be chosen, if desired, to increase the shelf-life of a product, e.g., it may be a high-barrier film.

If desired, the lining material may be a laminate. The laminate may comprise two or more plastic materials, e.g. two thin flexible plastic materials, two rigid vacuum-formable plastic materials or a rigid vacuum-formable plastic material and a thin flexible plastic material. Alternatively, the laminate may comprise a plastic material metallised on one or both of its surfaces, e.g. a polyethylene. In carrying out the present invention, the extruded solid product may also be pressed, for instance, by stamping or punching.

The extruded solid product may be deformed by passing between the nip of a pair of counter-rotating rollers provided with corresponding surface depressions to plastically form the extruded product into the shape conforming to the shape of the surface depressions and releasing the formed product from the nip of the pair of counter-rotating rollers.

Counter-rotating rollers suitable for deforming the extruded solid product in the process of the present invention are commonly used in the food and pharmaceutical industry for a range of products, e.g. boiled sweets, chocolate lentils (SMARTIES candy), biscuits and drug capsules. The cavity formed by the two corresponding circumferential depressions of the rollers may be almost any desired shape, provided there are no "negative angles" which would prevent the shaped product from releasing from the cavity, e.g. spherical, ovoid, discoid or cubic. In addition, the surface of the cavity may be engraved or embossed with any desired pattern which is to be imparted to the surface of the fat-containing confectionery material.

It should be understood that the temporary flexibility or plasticity of the extruded product enables the product to be physically manipulated or plastically deformed before it loses its flexibility or plasticity, so that it may completely fill the cavity in one piece without leaving gaps or without crumbling in the cavity.

The formed product emerges from the nip of the counter-rotating rollers as a series of shaped sweets which are normally and advantageously held together by a thin web of fat-containing confectionery material, e.g. having a thickness of from 50 to 100 microns. The presence of this web helps to pull or demould the sweets from the cavity surface of the rollers. It is not essential to have a web holding the sweets together. However, if there were no web, in order to obtain separated sweets, the rollers would have to be held together under a very high pressure and this would lead to increased wear of the rollers in a continuous operation.

The rollers may, if desired, be cooled, e.g. to −15° C., preferably to from 5° to 15° C., for instance by means of the circulation of a cooling medium, e.g. water or a water/glycol mixture through the central axis of each roller. However, because the fat-containing confectionery material is substantially solid or semi-solid and, therefore, already at a relatively low temperature, e.g. below about 35° C., a high cooling capacity is not required. However, a slight cooling, e.g. up to 5° C., may improve the release of the shaped product from the cavity by preventing sticking.

After emerging from the nip of the counter-rotating rollers, the series of shaped sweets held together by the thin web is advantageously treated to remove the web, for example, by feeding into a rotating cylindrical sieve to remove the web by a tumbling action to leave separate sweets. The sweets may then be packed or fed to a further downstream process.

In contrast to most other chocolate moulding processes, the final product does not require cooling after the forming has occurred. In addition, the formation of chocolate centres for SMARTIES candy (RTM) may be carried out without the requirement for the high cooling capacity of the current roller system. Moreover, the use of continuous counter-rotating rollers is faster than injection moulding for a given shape because the the cavities at the nip are continuously opening to allow entry of the product, closing to mould the product and opening to allow release of the moulded product.

The rollers may be-made of a suitable rigid material such as metal, e.g. steel or a plastics material, e.g. polycarbonate.

The final shape of the formed product depends on the shape of the cavity and its surface features.

The extruded solid product may be deformed, for instance, by bending such as passing around a rotating spindle to form a shape like a spring or a Swiss Roll. The Swiss Roll shaped product may, if desired, have a filling in which case the extruded solid product may be passed around the rotating spindle together with a layer of a different product such as fondant, praline or ice cream which forms the filling.

The details of the extrusion of the fat-containing confectionery material are described in the afore-noted '467 Application whose disclosure is hereby incorporated into the present specification.

By "substantially isothermally" in this invention we mean that the temperature of the fat-containing confectionery material remains substantially unchanged under the conditions of the extrusion from the input to the outlet of the flow constriction and during forming if there is no external heating or cooling means. However, the use of external heating or cooling means is not excluded as long as the material being extruded remains in a substantially solid or semi-solid non-pourable or non-flowable state throughout the extrusion and forming. In other words, the temperature of the fat-containing confectionery material is not caused to increase substantially by the extrusion or forming process itself, and as described in the '467 Application, the physical state of the fat-containing confectionery material is such that its general deformation behavior during extrusion is of plastic nature rather than that of a viscous fluid.

The fat-containing confectionery material may be, for instance, plain, white or milk chocolate or chocolate substitutes containing direct cocoa butter replacements, stearines, coconut oil, palm oil, butter or any mixture thereof; nut pastes such as peanut butter and fat; praline; confectioner's coatings used for covering cakes usually comprising chocolate analogues with cocoa butter replaced by a cheaper non-tempering fat; or CARAMAC candy comprising non-cocoa butter fats, sugar and milk.

The flow constriction may be any narrowing of the cross-sectional area of a conduit, but it is usually a die, and extrusion can be generated by a differential pressure across the flow constriction which may be established, for example, by a ram extruder conveniently operating at a controlled rate or pressure. The extruder may be, for example, a DAVENPORT extruder, a constant pressure extruder, a single-screw extruder, a twin-screw extruder or CONFORM maching. The extrusion process may be continuous or batch.

The fat-containing confectionery material may be fed into the barrel of the extruder in a liquid or paste form, but it preferably is fed into the barrel in a solid or semi-solid non-pourable form. The fat-containing confectionery material may be in a granular or continuous form. When in granular form, the granular nature of the fat-containing confectionery material appears to be lost during extrusion to give an essentially uniform material.

The extrusion and forming temperature may be from as low as 0° C. to about 35° C. depending on the composition, particularly the amount and type of fat present. When plain chocolate is used as the extruded feed material, the forming temperature may be from 10° to 34° C., more usually from 15° to 32° C., preferably from 18° to 30° C. and more preferably from 20° to 27° C. In the case of white chocolate, the forming temperature may be from 5° to 28° C., more usually from 15° to 27° C., preferably from 17° to 26° C. and more preferably from 19° to 25° C. In the case of milk chocolate, the forming temperature may be from 5° C. to 30° C., more usually from 15° C. to 28° C., preferably from 18° to 27° C. and more preferably from 20° to 26° C. It should be understood that, in this invention, when the chocolate is formed at a temperature from 28° to 34° C. it is in a solid or semi-solid non-pourable or non-flowable state after being previously set hard in-contrast to chocolate which has not been previously set hard such as recently tempered chocolate which is usually still pasty and pourable or flowable at such temperatures.

The extrusion process necessarily includes a form of deformation between the input and outlet of the extrusion system. The convergence or contraction ratio into any extrusion orifice is preferably greater than 1.5, the convergence or contraction ratio being defined as the ratio of the inlet area to the minimum cross-sectional area of the die for a simple cylindrical extrusion geometry.

During extrusion, it is important that the fat-containing confectionery material does not become pourable, and the extrusion temperature and pressure should be maintained below a level where this may happen.

The extrusion pressure is partially dependent, amongst other things, on the contraction ratio, the extrusion temperature and the confectionery composition and may be from 1 to 1000 bars, e.g. from 5 to 500 bars and typically from 5 to 250 bars.

An important feature of the extrusion process is that for a given die configuration and material composition, the extrusion rate is weakly dependent upon the extrusion pressure.

The sectional geometry of the die may be of a square or profiled form. Typically, it might be a conical entry with an inlet cone angle of from 10° to 90°. The flow rate of the chocolate through the extruder die will depend amongst other things on extrusion pressure, temperature, die configuration and material formulation. Extrusion rates may vary from 0.1 cm/second to in excess of 1 metre/second, for instance.

A wide variety of die shapes may be used and the extruded fat-containing confectionery material may have a solid profiled or hollow section and essentially has the same shape as the die, e.g. rods, spirals, twists, springs, hollow sections such as tubes and more complex shapes such as the letters of the alphabet as well as thin films having a thickness which may be as little as 100 microns. The dimensions of the die depend on the desired size of the extruded product. A multi-orifice die head could also be used, if desired. Multi-material co-extrusion is also possible with this technique, and the extrusion of the fat-containing confectionery material may be carried out as a co-extrusion with other food materials. Co-extrusion with other food materials such as ice cream, fondant, etc., is especially advantageous when the fat-containing confectionery material is extruded in a hollow or tubular form.

The present invention is described by way of example only with reference to the following drawings.

DETAILED DESCRIPTION OF THE DRAWINGS

Figure 1:
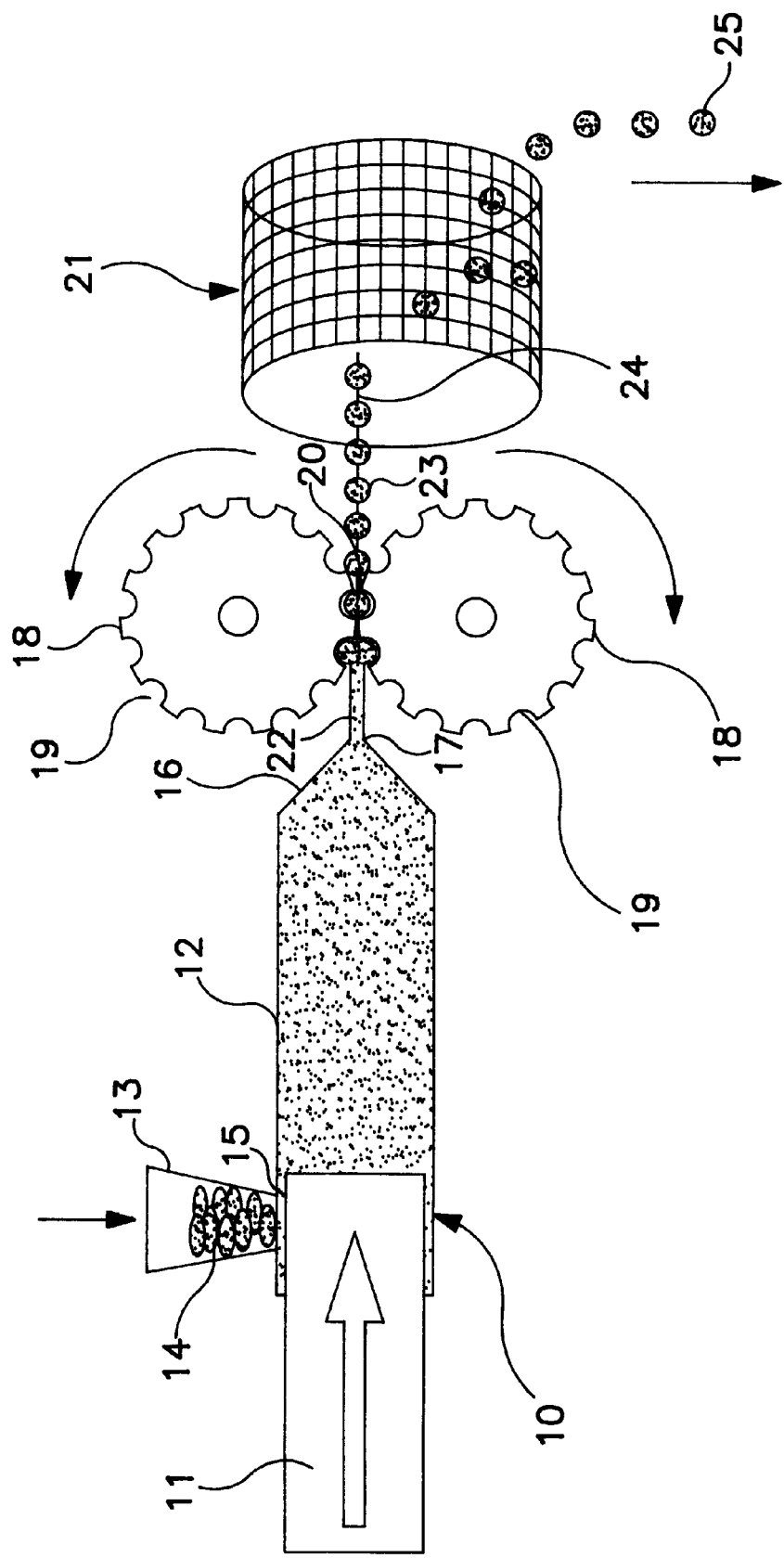
FIG. 1 illustrates an apparatus for deforming a product extruded by the process of the present invention.

Referring to FIG. 1, an extrusion device 10 comprises a hydraulically driven ram 11, a barrel 12 having an internal diameter of 25 mm, a hopper 13 containing chocolate buttons 14, a feed opening 15 and an extrusion die 16 with a nozzle 17 having a cross-section of 5 mm diameter. A pair of counter-rotating rollers 18 are provided with circumferential depressions 19 which correspond at the nip to form a cavity 20 downstream of which is a cylindrical sieve 21 rotating on its horizontal axis.

In operation, the chocolate buttons 14 are fed through the feed opening 15 into the barrel 12, and the hydraulic ram 11 is advanced at a pressure of 80 bars and at a temperature of 23° C. A semi-solid non-pourable rod 22 of chocolate of 5 mm diameter is extruded through the nozzle 17 which is then fed into the nip of the counter-rotating rollers 18 where it passes through the cavity 20 and is formed and then released from the cavity as a series of shaped sweets 23 held together by a web 24 of chocolate. On passing through the rotating sieve 21, the web 24 is removed by a tumbling action and the chocolate sweets 25 are separated and released for packaging or further processing.

Figure 2:
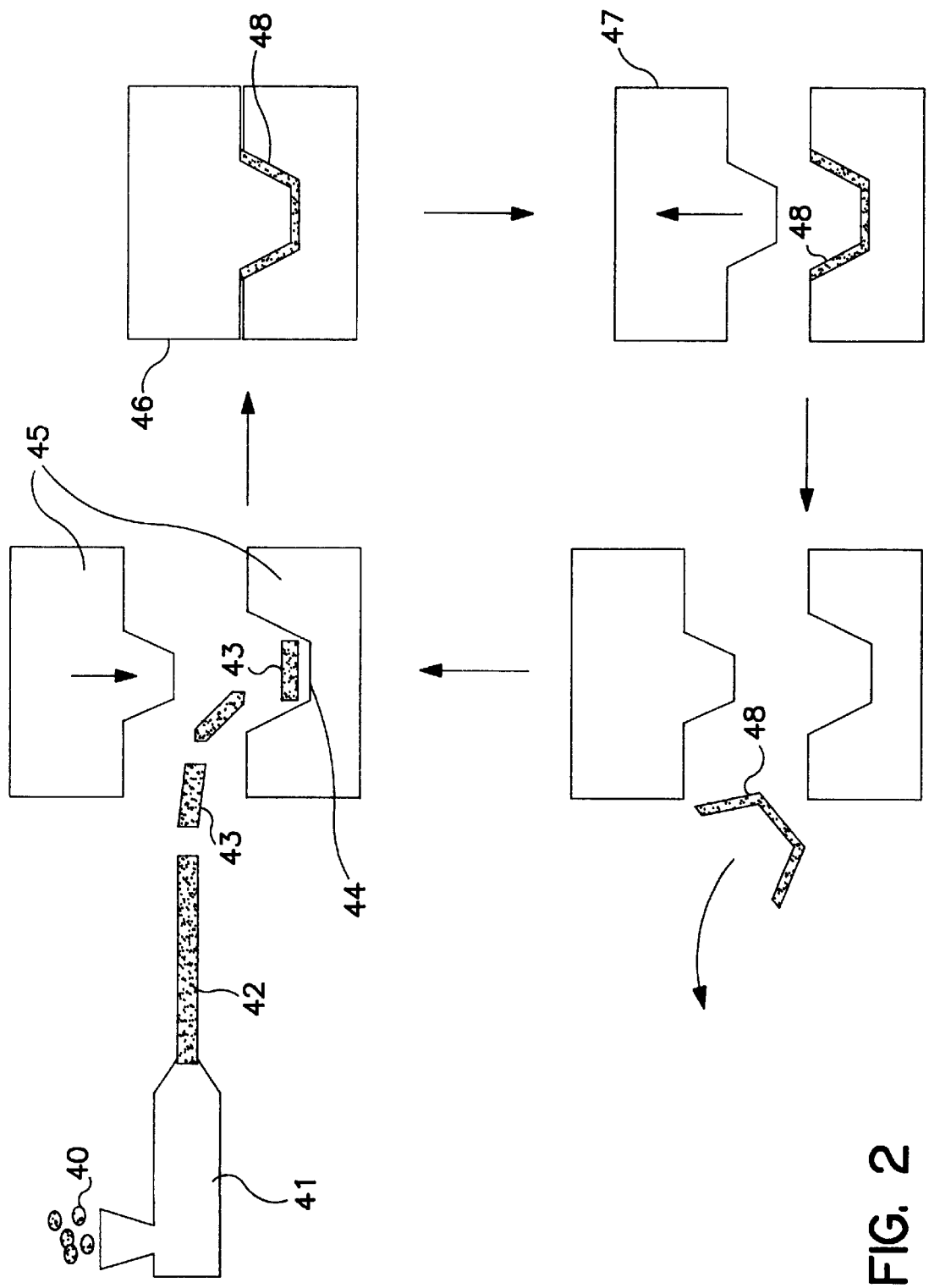
FIG. 2 illustrates the steps in the compression moulding of a product extruded by the process of the present invention.

Referring to FIG. 2, solid chocolate buttons 40 are fed into an extruder 41 and extruded in a similar manner to that described for FIG. 1 to produce a rod 42 of temporarily flexible non-pourable or non-flowable solid extruded chocolate. The rod 42 is cut into slugs 43 which are placed in the tool cavity 44 of a compression tool 45. One molding tool part is brought together with the other molding tool part so the tool closes at 46 and compresses the slug 43 so that the slug is moulded into the shape 48 in the cavity defined between the two molding tool parts. One tool part then is separated from the other so the compression tool opens at 47 and the moulded shape 48 is ejected by tapping it out.

Figure 3:
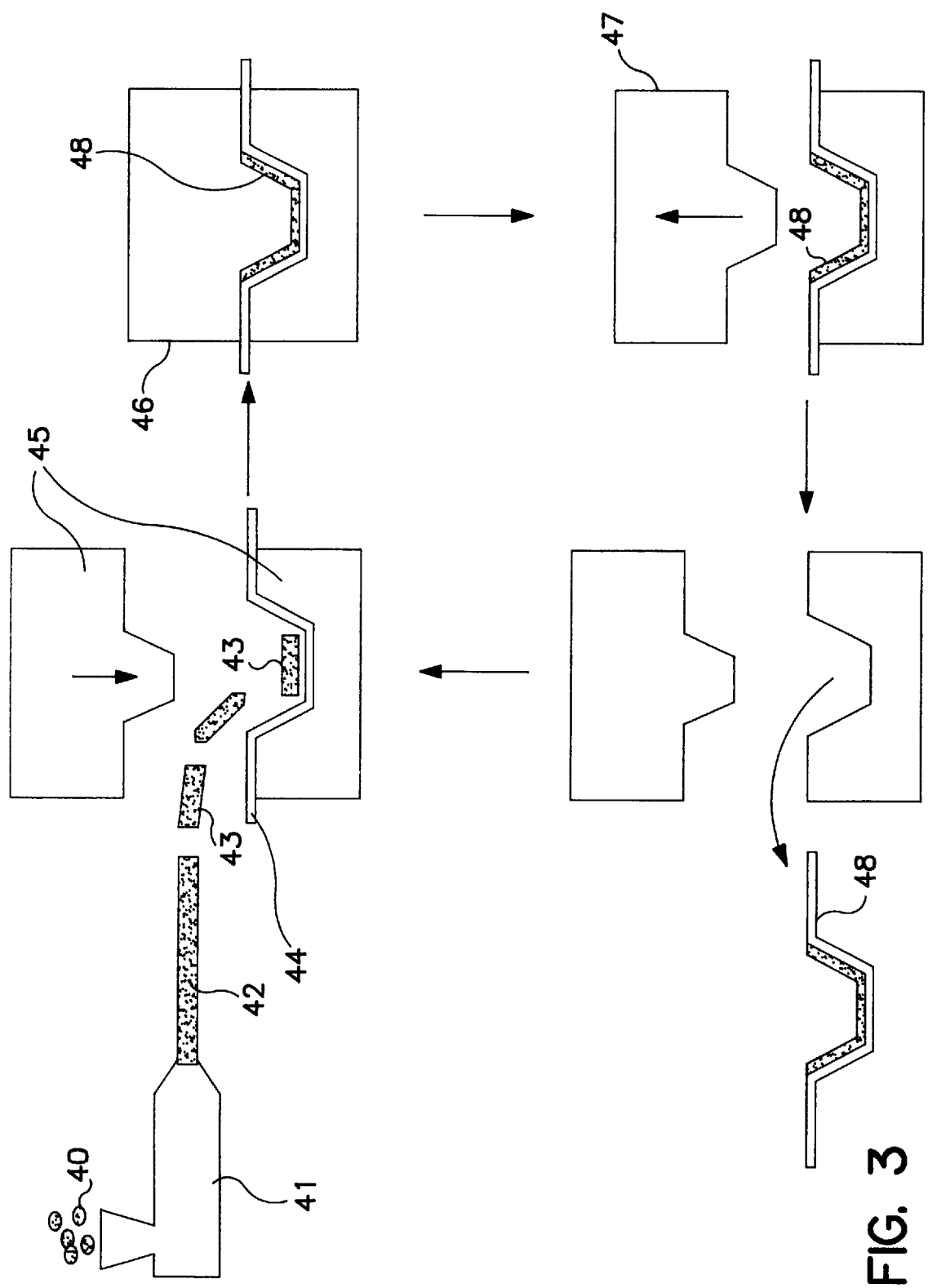
FIG. 3 illustrates the steps in the compression moulding of a product extruded by the process of the present invention into a packaging material.

FIG. 3 illustrates a similar process to that of FIG. 2 except that a preformed packaging film of 400 micron polyvinyl chloride 44 is placed in the tool cavity before the slug 43. In this case, when the mould is closed the slug of chocolate is formed into the packaging material and ejected together with the packaging material.

The ejected moulded product in either FIG. 2 or 3 may, if desired, be filled with one or more of ice cream, wafer, caramel, fondant, biscuits, praline jelly, etc. before closing with a layer of chocolate.

We claim:

1. In a process for preparing a food article which comprises a fat-containing confectionery material wherein a fat-containing confectionery material is fed into an extruder and pressure is applied to the material to pass the material through the extruder and to and through a flow-constriction and die to obtain an extrudate from the die so that the material passed through the extruder and so that the extrudate from the die are in a non-pourable state and so that the material passed to the die plastically deforms and so that the extrudate is plastically deformable for a period of time, an improvement comprising, during the time the extrudate is plastically deformable, placing a measured quantity of the extrudate into a cavity of a first molding tool part, pressing the extrudate in the cavity with a second molding tool part, which upon being brought together with the first molding tool part, defines a cavity shape between the two molding tool parts, to deform and mold the extrudate into the cavity shape defined between the molding tool parts, to obtain a shaped extrudate, contained by the first molding tool part, separating the second molding tool part from the first molding tool part and from the shaped extrudate article and demolding the shaped extrudate article from the first molding tool part.

2. A process according to claim 1 wherein the two molding tools brought together define a hollowed shell shape and the shaped extrudate article is a hollowed shell.

3. A process according to claim 2 wherein a further improvement comprises filling a foodstuff into the hollowed shell.

4. A process according to claim 3 wherein the food-stuff is selected from the group consisting of caramel, fondant, praline, jelly, ice cream, wafer and biscuit.

5. A process according to claim 4 wherein the fat-containing confectionery material is selected from the group consisting of a chocolate, of a chocolate substitute comprising a cocoa butter replacement and of a chocolate analog comprising a cocoa butter replacement.

6. A process according to claim 2 wherein a further improvement comprises, prior to placing the measured quantity of the extrudate into the first molding tool part cavity, placing a foodgrade lining material into the cavity for lining the cavity to obtain a lined cavity and to contain the shaped extrudate article and then placing the measured extrudate quantity into the lined cavity on the lining material.

7. A process according to claim 6 wherein the fat-containing confectionery material is selected from the group consisting of a chocolate, of a chocolate substitute comprising a cocoa butter replacement and of a chocolate analog comprising a cocoa butter replacement.

8. A process according to claim 2 wherein the fat-containing confectionery material is selected from the group consisting of a chocolate, of a chocolate substitute comprising a cocoa butter replacement and of a chocolate analog comprising a cocoa butter replacement.

9. A process according to claim 1 wherein a further improvement comprises, prior to placing the measured quantity of the extrudate into the first molding tool part cavity, placing a food-grade lining material into the cavity for lining the cavity to obtain a lined cavity and to contain the shaped extrudate article and then placing the measured extrudate quantity into the lined cavity on the lining material.

10. A process according to claim 9 wherein the fat-containing confectionery material is selected from the group consisting of a chocolate, of a chocolate substitute comprising a cocoa butter replacement and of a chocolate analog comprising a cocoa butter replacement.

11. A process according to claim 1 wherein the fat-containing confectionery material is selected from the group consisting of a chocolate, of a chocolate substitute comprising a cocoa butter replacement of a chocolate analog comprising a cocoa butter replacement.

12. In a process for preparing a food article which comprises a fat-containing confectionery material wherein a fat-containing confectionery material is fed into an extruder and pressure is applied to the material to pass the material through the extruder and to and through a flow-constriction and die to obtain an extrudate from the die so that the material passed through the extruder and so that the extrudate from the die are in a non-pourable state and so that the material passed to the die plastically deforms and so that the exrudate is plastically deformable for a period of time, the improvements comprising, during the time the extruder is plastically deformable, passing the extrudate to a nip between a pair of counter-rotating rollers having surfaces, wherein the surfaces comprise shaped depressions for forming extrudate portions into articles having a shape which conforms with a shape of the surface depressions, so that the extrudate passes to and through the nip and to the depressions so that extrudate portions are shaped so that shaped product articles are formed by the depressions and so that the shaped articles are joined together by a web of the material so that upon passage through and from the nip, the shaped articles are obtained from the depressions and held together by the web material and after obtaining the shaped articles held together by the web material, treating the shaped articles held together by the web material to remove the web material from the articles to obtain the shaped articles.

13. A process according to claim 12 wherein the treating comprises tumbling the shaped articles held together by the web material in a rotating sieve to remove the web material from the articles.

14. A process according to claim 12 wherein the treating comprises rotating a sieve and feeding the shaped articles held together by the web material to the rotating sieve and tumbling the articles held together by the web material in the rotating sieve to remove the web material from the articles.

15. A process according to claim 12 wherein the counter-rotating rollers are cooled to a temperature of from 5° C. to 15° C.

16. A process according to claim 12 wherein the counter-rotating rollers are cooled to a temperature of from 5° C. to 15° C.

17. A process according to claim 12 wherein the fat-containing confectionery material is selected from the group consisting of a chocolate, of a chocolate substitute comprising a cocoa butter replacement and of a chocolate analog comprising a cocoa butter replacement.

18. A process according to claim 12 wherein the fat-containing confectionery material is selected from the group consisting of a chocolate, of a chocolate substitute comprising a cocoa butter replacement and of a chocolate analog comprising a cocoa butter replacement.

19. A process according to claim 12 wherein the fat-containing confectionery material is selected from the group consisting of a chocolate, of a chocolate substitute comprising a cocoa butter replacement and of a chocolate analog comprising a cocoa butter replacement.

* * * * *